US011185071B2

(12) United States Patent
Osborn et al.

(10) Patent No.: US 11,185,071 B2
(45) Date of Patent: *Nov. 30, 2021

(54) ANTI-MICROBIAL POLYMER COMPOSITIONS, FIBERS, AND YARNS

(71) Applicant: Ascend Performance Materials Operations LLC, Houston, TX (US)

(72) Inventors: Scott E. Osborn, Pensacola, FL (US); Wai-shing Yung, Pensacola, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,186

(22) Filed: Dec. 18, 2019

(65) Prior Publication Data
US 2020/0187494 A1 Jun. 18, 2020

Related U.S. Application Data

(60) Provisional application No. 62/781,247, filed on Dec. 18, 2018.

(51) Int. Cl.
*A01N 25/10* (2006.01)
*A01N 57/22* (2006.01)
*A01N 59/00* (2006.01)
*A01N 59/26* (2006.01)

(52) U.S. Cl.
CPC ............ *A01N 25/10* (2013.01); *A01N 57/22* (2013.01); *A01N 59/00* (2013.01); *A01N 59/26* (2013.01)

(58) Field of Classification Search
CPC ........ A01N 25/10; A01N 59/00; A01N 59/26; A01N 59/16
See application file for complete search history.

(56) References Cited

U.S. PATENT DOCUMENTS

| 3,228,898 A | 1/1966 | Gerhard et al. | |
| 3,509,107 A * | 4/1970 | Brignac | C08L 77/00 528/487 |
| 4,237,034 A | 12/1980 | Tomka et al. | |
| 4,701,518 A * | 10/1987 | Osborn | C08K 3/22 523/122 |
| 4,952,345 A * | 8/1990 | Rao | D01D 1/04 264/40.6 |
| 5,929,200 A * | 7/1999 | Pagilagan | C08G 69/28 528/313 |
| 6,013,275 A * | 1/2000 | Konagaya | C08G 63/6926 424/443 |
| 6,584,668 B2 | 7/2003 | Green et al. | |
| 2003/0054158 A1* | 3/2003 | Smith | D01F 6/60 428/323 |
| 2005/0215157 A1* | 9/2005 | Dugan | D01F 8/04 442/411 |
| 2011/0028614 A1* | 2/2011 | Shikano | C08G 69/28 524/126 |

FOREIGN PATENT DOCUMENTS

| EP | 1270776 | 1/2003 |
| EP | 2530120 | 12/2012 |
| WO | 9510940 | 4/1995 |
| WO | 9522577 | 8/1995 |
| WO | 2020014585 | 1/2020 |

OTHER PUBLICATIONS

Panthi et al., "Interior Synthesizing of ZnO Nanoflakes Inside Nylon-6 Electrospun Nanofibers", Journal of Applied Polymer Science, vol. 127, Issue 3, May 10, 2012, pp. 2025-2032.
International Application No. PCT/US2019/067073, "International Search Report and Written Opinion", dated Mar. 20, 2020, 15 pages.
International Application No. PCT/US2019/067078, "International Search Report and Written Opinion", dated Mar. 23, 2020, 15 pages.

\* cited by examiner

*Primary Examiner* — Mark V Stevens
(74) *Attorney, Agent, or Firm* — Cozen O'Connor

(57) ABSTRACT

The present disclosure relates the polymer compositions, fibers, and yarns having near-permanent antimicrobial activity, and a method of producing the same. In one embodiment, the antimicrobial polymer composition from 50 wt % to 99.9 wt % of a polymer, from 5 wppm to 1000 wppm of zinc, and from 0.005 wt % to 1 wt % of phosphorus, wherein fibers formed from the polymer composition demonstrate a zinc retention rate of greater than 20% when tested in a dye bath test.

19 Claims, No Drawings

ANTI-MICROBIAL POLYMER COMPOSITIONS, FIBERS, AND YARNS

CROSS-REFERENCE TO RELATED APPLICATION

This application is related to and claims priority to U.S. Provisional Patent Application No. 62/781,247, filed Dec. 18, 2018, which is incorporated herein by reference.

FIELD

The present disclosure relates to polymer compositions, fibers, and yarns having (near-permanent) antimicrobial properties. In particular, the present disclosure relates to antimicrobial fibers and yarns formed from a polymer composition comprising unique antimicrobial components.

BACKGROUND

There is a growing interest in fabrics having antimicrobial properties. In an attempt to achieve such properties, conventional techniques have applied a number of treatments or coatings to fibers to impart antimicrobial properties to fabrics. Compounds containing copper, silver, gold, or zinc, either individually or in combination, have been used in these applications to effectively combat pathogens such as bacteria, mold, mildew, virus, spores, and fungus.

These types of antimicrobial fibers and fabrics may be used in many industries including healthcare, hospitality, military, and athletics, among others. However, these coated fibers and fabrics have struggled to meet many other requirements of these applications.

For example, in the healthcare and hospitality industries, certain fabrics are required to be sanitary at all times. To comply with these sanitation standards, the fabrics are subject to daily washing and, often times, bleaching. Thus, in many applications repeated cycles of use, washing, or soaking are quite common. Unfortunately, conventional fibers and fabrics have been found to deteriorate and lose antimicrobial properties during repeated uses and/or wash cycles.

Additionally, many of the conventional antimicrobial fabrics do not demonstrate sufficient antimicrobial properties, nor do they retain these properties when the fabrics are dyed. Fabrics are often dyed with or in various colors by submerging the fabric in a dye bath. In many cases, however, antimicrobial additives are extracted from the fibers/fabric, e.g., during dyeing operations, which causes the antimicrobial properties to deteriorate. Further, the antimicrobial treatments/coatings that may be extracted from conventional fabrics may have undesired environmental consequences.

As one example of conventional antimicrobial yarns and fabrics, U.S. Pat. No. 6,584,668 discloses durable non-electrically conductive metal treatments applied to yarns and textile fabrics. The durable non-electrically conductive metal treatments are coatings or finishes applied to yarns and textile fabrics. The metal treatments may include silver and/or silver ions, zinc, iron, copper, nickel, cobalt, aluminum, gold, manganese, magnesium, and the like. The metal treatments are applied to the exterior surface of the yarn or fabric as a coating or film.

Some synthetic fibers having antimicrobial fibers are also known in the art. For example, U.S. Pat. No. 4,701,518 discloses an antimicrobial nylon prepared in water with a zinc compound phosphorus compound to form carpet fibers. The process produces nylon fibers for carpets having 18 denier per filament (dpf), and are prepared by conventional melt polymerization. Such carpet fibers typically have average diameters that are well above 30 microns, which are generally unsuitable for next-to-skin applications. Furthermore, the conventional additives added to polymer compositions to impart antimicrobial properties in the synthetic fibers made therefrom have been found to reduce the relative viscosity in the polymer compositions. This reduced relative viscosity produces further difficulty in producing synthetic fibers from the polymer composition, e.g., increased difficulty in extruding the polymer composition.

Although some references may teach the use of antimicrobial fibers and fabrics, a need exists for polymer compositions, as well as antimicrobial fibers and fabrics made therefrom, that retain antimicrobial properties, e.g., have improved antimicrobial retention rates, and/or resistance to the extraction of antimicrobial additives therefrom, while also being able to achieve thinner fiber diameters and/or denier.

SUMMARY

According to one embodiment, the present disclosure relate to a polymer composition having antimicrobial properties, the composition comprising: from 50 wt % to 99.9 wt % of a polymer, from 5 wppm to 1000 wppm of zinc (optionally provided in a zinc compound), and from 0.005 wt % to 1 wt % of phosphorus (optionally provided in a phosphorus compound), wherein fibers formed from the polymer composition demonstrate an extraction rate of the zinc compound of less than 35% when tested in a dye bath test. In some aspects, the molar ratio of the phosphorus to the zinc in the polymer composition is at least 0.01:1. In some aspect, the polymer composition has a relative viscosity of at least 25. In some aspects, the polymer composition further comprises a delusterant comprising a titanium compound. In those aspects, the delusterant may be present in an amount less than 2.0 wt % and at least a portion of the delusterant may interact with the zinc compound. In some aspects, fibers formed from the polymer composition demonstrate an extraction rate of the zinc compound of less than 25% when tested in a dye bath test. In some aspects, the phosphorus compound comprises benzene phosphinic acid, phosphorous acid, or manganese hypophosphite, or combinations thereof. In some aspects, the zinc compound comprises zinc oxide, zinc ammonium adipate, zinc acetate, or zinc pyrithione, or combinations thereof. In some aspects, the zinc compound comprises zinc oxide. In some aspects, the polymer composition demonstrates *S. aureus* reduction greater than 75% as measured by ISO 20743:2013. In some aspects, the polymer composition demonstrates *K. pnuemoniae* reduction greater than 90% as measured by ISO 20743:2013. In one aspect, the zinc compound comprises zinc oxide, and the polymer composition has a relative viscosity of at least 37.5. In another aspect, the zinc compound comprises zinc oxide, zinc pyrithione, or zinc ammonium adipate, or combinations thereof; the phosphorus compound comprises benzene phosphinic acid, the molar ratio of the phosphorus to the zinc ranges from 0.01:1 to 3:1, the polymer composition has a relative viscosity of at least 32, and fibers formed from the polymer composition demonstrate an extraction rate of the zinc compound of less than 15% when tested in a dye bath test. In another aspect, the zinc compound comprises zinc oxide, the phosphorus compound comprises benzene phosphinic acid, the molar ratio of the phosphorus to the zinc ranges from 0.01:1 to 2.5:1, the polymer composition has a relative viscosity of at least 40, and fibers formed from the polymer composition demonstrate an extraction rate of the zinc compound of less than 12% when tested in a dye bath test. In another aspect, the zinc compound comprises zinc ammonium adipate, fibers formed from the polymer composition demonstrate an extraction rate of the zinc compound of less than 15% when tested in a dye bath test, and the polymer composition demonstrates *S. aureus* reduction greater than 95% as measured by ISO 20743:2013. In another aspect, the zinc compound comprises zinc oxide and zinc ammonium adipate, the phosphorus compound comprises benzene phosphinic acid, the molar ratio of the phosphorus to the zinc ranges from 0.01:1 to 2.5:1, the polymer composition has a relative viscosity of at least 32, and fibers formed from the polymer composition demonstrate an extraction rate of the zinc compound of less than 15% when tested in a dye bath test. In some aspects, the dye bath test comprises a liquid solution at a pH less than 5.

In some embodiments, the present disclosure relate to a method for making antimicrobial fibers comprising: providing a polymer composition having antimicrobial properties, the composition comprising from 50 wt % to 99.9 wt % of a polymer, from 5 wppm to 1000 wppm of zinc in a zinc compound, from 0.005 to 1 wt % of phosphorus in a phosphorus compound, and forming the polymer composition into fibers, wherein the fibers demonstrate an extraction rate of the zinc compound of less than 35% when tested in a dye bath test. In some aspects, the polymer composition has a relative viscosity of at least 25. In some aspects, the molar ratio of the phosphorus to the zinc in the polymer composition is at least 0.01:1. In some aspects, the molar ratio of the phosphorus to the zinc in the polymer composition is at least 0.5:1.

DETAILED DESCRIPTION

Introduction

As discussed above, some conventional antimicrobial fibers and fabrics utilize antimicrobial compounds to reduce pathogen growth (to inhibit pathogens). For example, some fabrics may include antimicrobial additives, e.g., silver, coated or applied as a film on an exterior layer. However, it has been found that these treatments or coatings often present a host of problems. The inventors have found that, in some conventional applications where antimicrobial additives are components of the fiber, the antimicrobial additives may extract out of the fibers/fabric during the dyeing process, which adversely affects antimicrobial properties and detrimentally places the additives into the environment. In addition to this problem, the inventors have discovered that some antimicrobial additives may negatively impact the relative viscosity of the resultant polymer composition.

Some references, e.g., carpet fiber-related references, have disclosed the use of an antimicrobial nylon prepared in water with a zinc compound and phosphorus compound to form the carpet fibers. These references, however, relate to higher denier levels (for example, greater than 12 dpf) and/or higher fiber diameter (for example, greater than 20 microns) fibers/filaments. These teachings, however are typically not relevant to other types of fibers, e.g., those used in next-to-skin textiles or nonwovens. Carpet fibers are formed via entirely different, non-analogous processes/equipment, which results in entirely different products. In view of these significant differences, the teachings of such carpet fiber references are not typically considered relevant to other types of fibers/filaments. More specifically, in carpet fiber production, formulations having different amounts, e.g., higher amounts, of phosphorus compounds (optionally with zinc compounds) are employed for their ability to increase relative viscosity of the polymer. However, phosphorous compounds are not typically used in other small fiber or nonwoven polymer formulations because the use and the accompanying relative viscosity build might contribute to processability issues. Stated another way, the equipment and processes cannot process the carpet formulation (with the increased relative viscosity), because it could impede processability and make production difficult if not impossible. In contrast to carpet formulations, the polyamide compositions disclosed herein comprise a unique combination of zinc and optionally phosphorus, each preferably in particular amounts, e.g., lower amounts, that retards or eliminates the viscosity build that is associated with conventional carpet fiber formulations (and also provides additional synergistic benefits). As a result, the formulations disclosed herein are surprisingly capable of forming much thinner fibers, e.g., in the form of fibers, yarns, or nonwoven webs, having improved anti-microbial properties, while avoiding the aforementioned processing problems.

Also, although some references directly mix antimicrobial agents with fibers, leathers, or plastics, such processes do not address/solve problems of deterioration of the antimicrobial properties of the products, e.g., via extraction loss. Still other conventional antimicrobial fabrics have been found to have insufficient strength for apparel applications, e.g., an inability to withstand significant washing, and are unable to retain antimicrobial properties over the product lifetime.

It has now been discovered that presence of a zinc compound and a phosphorus compound, each preferably in specific amounts in a polymer composition, provides for antimicrobial fibers and yarns that are able to retain antimicrobial compounds (and thus antimicrobial properties) during and after dyeing. As a results, a synergistic combination of zinc retention and antimicrobial efficacy is surprisingly achieved.

Without being bound by theory, the use of the phosphorus compound in the specific amounts may allow the zinc compound (zinc) to be more stably disposed in the polymer and/or in the fibers, and, as such, may retard leaching of the zinc compound (zinc) from the fibers/yarns/fabrics, e.g., during washing and/or dyeing. Stated another way, the polymer composition may have certain amounts of a zinc compound and a phosphorus compound embedded in the polyamide such that the polymer composition maintains a higher relative viscosity and retains antimicrobial properties during and after dyeing. In addition, the use of the phosphorus compound in the specific amounts may work with the zinc to improve the relative viscosity of the polymer.

As a result, the disclosed fibers, yarns, and fabrics made from the polymer compositions advantageously eliminate the need for a topical treatment to make apparel antimicrobial. The present antimicrobial fibers and fabrics have "built-in" antimicrobial properties. And these properties beneficially will not extract out, e.g., wash away, after dyeing. In addition, the disclosed polymer compositions are able to maintain desired relative viscosity levels, which provides for advantageous processing benefits. Further, the antimicrobial fibers can maintain colorfastness (a characteristic that relates to a material's resistance to color fading or running) and durability. Unlike conventional antimicrobial fabrics, the present fibers and fabrics substantially retain their antimicrobial activity from leaching and extraction after dyeing. Further, the present fibers have significantly lower denier and lower average diameter, which beneficially makes them useful in many end applications, e.g., apparel and filtration, where the thicker, higher denier fibers are unsuitable.

The present disclosure relates to a polymer composition, which may in some cases be used to form antimicrobial fibers, as well as yarns, and/or fabrics formed therefrom. The polymer composition comprises antimicrobial agents, which are efficacious and are provide for significant resistance to extraction from the fiber. The polymer composition comprises a polymer, zinc (provided to the composition via in a zinc compound), and phosphorus (provided to the composition via a phosphorus compound). The polymer may be present in an amount ranging from 50 wt % to 99.9 wt %; the zinc may be present in an amount ranging from 10 wppm to 1000 wppm; and the phosphorus may be present in an amount ranging from 0.01 wt % to 1 wt %. The polymer composition may be used to form fibers, and, in addition to improved antimicrobial performance, the fibers demonstrate superior zinc extraction rates, e.g., less than 35% zinc extracted, when tested in a dye bath test (as described herein). The fibers may demonstrate superior zinc retention rates.

In some embodiments, specific molar ratios of phosphorus to zinc are employed, e.g., wherein the phosphorus to zinc molar ratio is at least 0.01:1. Without being bound by theory, by maintaining a particular phosphorus to zinc balance, the polymer surprisingly achieves desirable relative viscosity levels, e.g., at least 25, while still maintaining the aforementioned antimicrobial properties.

The disclosure also relates to a process for making antimicrobial fibers. The process comprises the steps of providing the polymer composition having antimicrobial properties, and forming the polymer composition into fibers. It was also beneficially found that providing zinc (via a zinc compound) and phosphorus (via a phosphorus compound) to the polymer composition during the production process of the fibers, e.g., to the aqueous monomer solution, produces fibers with antimicrobial agents evenly dispersed throughout the entire fiber. In conventional processes, a silver coating is applied to the outer surface of the fabric to impart antimicrobial properties to the fabric. However, the silver coating is not dispersed throughout the fabric and is more susceptible to leaching components, e.g., silver, into the environment. Advantageously, the present polymer composition does not give rise to toxicity because it does not elute the antimicrobial agents, nor does it include any toxic components, e.g., silver. Additionally, antimicrobial fibers formed the present polymer composition do not require a separate application step since the antimicrobial agents are permanently disposed in the polymer.

Polymer

In some embodiments, the polymer composition may comprise a polymer suitable for producing fibers and fabrics. In one embodiment, the polymer composition comprises a polymer in an amount ranging from 40 wt % to 100 wt %, e.g., from 40 wt % to 99.99 wt %, from 40 wt % to 99.9 wt %, from 40 wt % to 99 wt %, from 50 wt % to 100 wt %, from 50 wt % to 99.99 wt %, from 50 wt % to 99.9 wt %, from 50 wt % to 99 wt % from 55 wt % to 100 wt %, from 55 wt % to 99.99 wt %, from 55 wt % to 99.9 wt %, from 55 wt. % to 99 wt %, from 60 wt % to 100 wt %, from 60 wt % to 99.99 wt %, from 60 wt % to 99.9 wt %, or from 60 wt % to 99 wt %. In terms of upper limits, the polymer composition may comprise less than 100 wt % of a polymer, e.g., less than 99.99 wt %, less than 99.9 wt %, or less than 99 wt %. In terms of lower limits, the polymer composition may comprise greater than 40 wt % of a polymer, e.g., greater than 50 wt %, greater than 55 wt %, or greater than 60 wt %.

The polymer of the polymer composition may vary widely. The polymer may include but is not limited to, a thermoplastic polymer, polyester, nylon, rayon, polyamide 6, polyamide 6,6, polyethylene (PE), polypropylene (PP), polyethylene terephthalate (PET), polyethylene terephthalate glycol (PETG), co-PET, polylactic acid (PLA), and polytrimethylene terephthalate (PTT). In some embodiments, the polymer composition may comprise PET, for its strength, longevity during washing, ability to be made permanent press, and ability to be blended with other fibers. In some embodiments, the polymer may be Nylon 6,6. In some cases, nylon is known to be a stronger fiber than PET and exhibits a non-drip burning characteristic that is beneficial e.g., in military applications, and is more hydrophilic than PET. The polymer used in the present disclosure can be a polyamide, polyether amide, polyether ester or polyether urethane or a mixture thereof.

In some cases, the polymer composition may comprise polyamides. Common polyamides include nylons and aramids. For example, the polyamide may comprise PA-4T/4I; PA-4T/6I; PA-5T/5I; PA-6; PA-6,6; PA-6,6/6; PA-6,6/6T; PA-6T/6I; PA-6T/6I/6; PA-6T/6; PA-6T/6I/66; PA-6T/MPMDT (where MPMDT is polyamide based on a mixture of hexamethylene diamine and 2-methylpentamethylene diamine as the diamine component and terephthalic acid as the diacid component); PA-6T/66; PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6I/6; PA-6T/6I/12; and copolymers, blends, mixtures and/or other combinations thereof. Additional suitable polyamides, additives, and other components are disclosed in U.S. patent application Ser. No. 16/003,528.

In some preferred cases, the polyamide-based, e.g., nylon-based, compounds are utilized as the polymer. It has surprisingly been found that these nylon-based polymers, when utilized with the aforementioned zinc compound and phosphorus compound additives and formed into fabrics, provide the antimicrobial characteristics. In some cases, it has been found that conventional polymers that utilize polyester polymers harbor and allow to flourish different types of bacteria, as compared to those of nylon. For example, micrococcus bacteria have been found to flourish in polyester-based fabrics. Thus the use of nylon-based polymers, along with the aforementioned additives, surprisingly has been found to yield fabrics that demonstrate significantly low odor levels as compared to similar fabrics that utilize polyesters.

The polymer composition may, in some embodiments, comprise a combination of polyamides. By combining various polyamides, the final composition may be able to incorporate the desirable properties, e.g., mechanical properties, of each constituent polyamides. For example, in some embodiments, the polyamide comprises a combination of PA-6, PA-6,6, and PA-6,6/6T. In these embodiments, the polyamide may comprise from 1 wt % to 99 wt % PA-6, from 30 wt % to 99 wt % PA-6,6, and from 1 wt % to 99 wt % PA-6,6/6T. In some embodiments, the polyamide comprises one or more of PA-6, PA-6,6, and PA-6,6/6T. In some aspects, the polymer composition comprises 6 wt % of PA-6 and 94 wt % of PA-6,6. In some aspects, the polymer composition comprises copolymers or blends of any of the polyamides mentioned herein.

The polymer composition may also comprise polyamides produced through the ring-opening polymerization or polycondensation, including the copolymerization and/or copolycondensation, of lactams. Without being bound by theory, these polyamides may include, for example, those produced from propriolactam, butyrolactam, valerolactam, and caprolactam. For example, in some embodiments, the polyamide is a polymer derived from the polymerization of caprolactam. In those embodiments, the polymer comprises at least 10 wt % caprolactam, e.g., at least 15 wt %, at least 20 wt %, at least 25 wt %, at least 30 wt %, at least 35 wt %, at least 40 wt %, at least 45 wt %, at least 50 wt %, at least 55 wt %, or at least 60 wt %. In some embodiments, the polymer includes from 10 wt % to 60 wt % of caprolactam, e.g., from 15 wt % to 55 wt %, from 20 wt % to 50 wt %, from 25 wt % to 45 wt %, or from 30 wt % to 40 wt %. In some embodiments, the polymer comprises less than 60 wt % caprolactam, e.g., less than 55 wt %, less than 50 wt %, less than 45 wt %, less than 40 wt %, less than 35 wt %, less than 30 wt %, less than 25 wt %, less than 20 wt %, or less than 15 wt %. Furthermore, the polymer composition may comprise the polyamides produced through the copolymerization of a lactam with a nylon, for example, the product of the copolymerization of a caprolactam with PA-6,6.

In some embodiments, the polymer composition may comprise additional additives. The additives include pigments, hydrophilic or hydrophobic additives, anti-odor additives and antimicrobial/anti-fungal inorganic compounds, such as copper, zinc, tin and silver.

In some aspects, the polymer composition can be combined with color pigments for coloration for the use in antimicrobial finished fabrics to withstand fading. In some aspects, the polymer composition can be combined with UV additives to withstand fading and degradation in fabrics exposed to significant UV light. In some aspects, the polymer composition can be combined with additives to make the surface of the fiber hydrophilic or hydrophobic. In some aspects, the polymer composition can be combined with additives to make the fabric flame retardant or flame resistant. In some aspects, the polymer composition can be combined with additives to make the fabric stain resistant. In some aspects, the polymer composition can be combined with pigments with the antimicrobial compounds so that the need for conventional dyeing and disposal of dye materials is avoided.

In some aspects, the polymer can formed by conventional polymerization of the polymer composition in which an aqueous solution of at least one diamine-carboxylic acid salt is heated to remove water and effect polymerization to form an antimicrobial nylon. This aqueous solution is preferably a mixture which includes at least one polyamide-forming salt in combination with the specific amounts of a zinc compound and a phosphorus compound described herein to produce a polymer composition. Conventional polyamide salts are formed by reaction of diamines with dicarboxylic acids with the resulting salt providing the monomer. In some embodiments, a preferred polyamide-forming salt is hexamethylenediamine adipate (nylon 6,6 salt) formed by the reaction of equimolar amounts of hexamethylenediamine and adipic acid.

Antimicrobial Components

As noted above, the polymer composition includes zinc in a zinc compound and phosphorus in a phosphorus compound, preferably in specific amounts in the polymer composition, to provide the aforementioned structural and antimicrobial benefits. As used herein, "zinc compound" refers to a compound having at least one zinc molecule or ion. As used herein, "phosphorus compound" refers to a compound having at least one phosphorus molecule or ion.

The inventors have found that the use of specific zinc compounds (and the zinc contained therein) and phosphorus compounds (and the phosphorus contained therein) at specific molar ratios minimizes the negative effects of the zinc compound on the polymer composition. For example, too much zinc compound in the polymer composition can lead to decreased polymer viscosity and inefficiencies in production processes.

The polymer composition comprises zinc (in a zinc compound), e.g., zinc or a zinc compound is dispersed within the polymer composition. In one embodiment, the polymer composition comprises zinc in an amount ranging from 5 wppm to 1000 wppm, e.g., from 5 wppm to 900 wppm, from 5 wppm to 700 wppm, from 5 wppm to 500 wppm, from 5 wppm to 400 wppm, from 10 wppm to 1000 wppm, from 10 wppm to 900 wppm, from 10 wppm to 700 wppm, from 10 wppm to 500 wppm, from 10 wppm to 400 wppm, from 50 wppm to 1000 wppm, from 50 wppm to 900 wppm, from 50 wppm to 700 wppm, from 50 wppm to 500 wppm, from 50 wppm to 400 wppm, from 100 wppm to 1000 wppm, from 100 wppm to 900 wppm, from 100 wppm to 700 wppm, from 100 wppm to 500 wppm, from 300 wppm to 500 wppm, from 100 wppm to 400 wppm, from 200 wppm to 1000 wppm, from 200 wppm to 900 wppm, from 200 wppm to 700 wppm, from 200 wppm to 500 wppm, or from 200 wppm to 400 wppm. In terms of lower limits, the polymer composition may comprise greater than 5 wppm of zinc, e.g., greater than 10 wppm, greater than 50 wppm, greater than 100 wppm, greater than 200 wppm, or greater than 300 wppm. In terms of upper limits, the polymer composition may comprise less than 1000 wppm of zinc, e.g., less than 900 wppm, less than 700 wppm, less than 500 wppm, or less than 400 wppm. In some aspects, the zinc compound is embedded in the polymer formed from the polymer composition.

The zinc of the polymer composition is present in or provided via a zinc compound, which may vary widely. The zinc compound may comprise zinc oxide, zinc ammonium adipate (which may be a mixture of ammonium adipate, zinc oxide, and optionally water) zinc acetate, zinc ammonium carbonate, zinc stearate, zinc phenyl phosphinic acid, or zinc pyrithione, or combinations thereof. In some embodiments, the zinc compound comprises zinc oxide, zinc ammonium adipate, zinc acetate, or zinc pyrithione, or combinations thereof. In some embodiments, the zinc compound comprises zinc oxide, or zinc ammonium adipate, or combinations thereof. In some aspects, the zinc is provided in the form of zinc oxide. In some aspects, the zinc is not provided via zinc phenyl phosphinate and/or zinc phenyl phosphonate.

The polymer composition comprises phosphorus (in a phosphorus compound), e.g., phosphorus or a phosphorus compound is dispersed within the polymer composition. In one embodiment, the polymer composition comprises phosphorus in an amount ranging from 50 wppm to 20000 wppm, e.g., from 50 wppm to 10000, from 50 wppm to 5000 wppm, from 50 wppm to 2500 wppm, from 50 wppm to 2000 wppm, from 50 wppm to 800 wppm, 100 wppm to 750 wppm, 100 wppm to 1800 wppm, from 100 wppm to 20000 wppm, from 100 wppm to 10000 wppm, from 100 wppm to 5000 wppm, from 100 wppm to 2500 wppm, from 100 wppm to 1000 wppm, from 100 wppm to 800 wppm, from 200 wppm to 20000 wppm, from 200 wppm to 10000 wppm, 200 wppm to 5000 wppm, from 200 wppm to 2500 wppm, from 200 ppm to 800 wppm, from 300 wppm to 20000, from 300 wppm to 10000 wppm, from 300 wppm to 5000 wppm, from 300 wppm to 2500 wppm, from 300 wppm to 500 wppm, from 500 wppm to 20000 wppm, from 500 wppm to 10000 wppm, from 500 wppm to 5000 wppm, or from 500 wppm to 2500 wppm. In terms of lower limits, the polymer composition may comprise greater than 50 wppm of phosphorus, e.g., greater than 75 wppm, greater than 100 wppm, greater than 150 wppm, greater than 200 wppm greater than 300 wppm or greater than 500 wppm. In terms of upper limits, the polymer composition may comprise less than 20000 wppm of phosphorus, e.g., less than 10000 wppm, less than 5000 wppm, less than 2500 wppm, less than 2000 wppm, less than 1800 wppm, less than 1500 wppm, less than 1000 wppm, less than 800 wppm, less than 750 wppm, less than 500 wppm, less than 475 wppm, less than 450 wppm, or less than 400 wppm. In some aspects, the phosphorus or the phosphorus compound is embedded in the polymer formed from the polymer composition.

The phosphorus of the polymer composition is present in or provided via a phosphorus compound, which may vary widely. The phosphorus compound may comprise bezene phosphinic acid, diphenylphosphinic acid, sodium phenylphosphinate, phosphorous acid, benzene phosphonic acid, calcium phenylphosphinate, potassium B-pentylphosphinate, methylphosphinic acid, manganese hypophosphite, sodium hypophosphite, monosodium phosphate, hypophosphorous acid, dimethylphosphinic acid, ethylphosphinic acid, diethylphosphinic acid, magnesium ethylphosphinate, triphenyl phosphite, diphenylmethyl phosphite, dimethylphenyl phosphite, ethyldiphenyl phosphite, phenylphosphonic acid, methylphosphonic acid, ethylphosphonic acid, potassium phenylphosphonate, sodium methylphosphonate, calcium ethylphosphonate, and combinations thereof. In some embodiments, the phosphorus compound comprises phosphoric acid, benzene phosphinic acid, or benzene phosphonic acid, or combinations thereof. In some embodiments, the phosphorus compound comprises benzene phosphinic acid, phosphorous acid, or manganese hypophosphite, or combinations thereof. In some aspects, the phosphorus compound may comprise benzene phosphinic acid.

In one embodiment, the molar ratio of the phosphorus to the zinc is greater than 0.01:1, e.g., greater than 0.05:1, greater than 0.1:1, greater than 0.15:1, greater than 0.2:1, greater than 0.25:1, greater than 0.5:1, or greater than 0.75:1. In terms of ranges, the molar ratio of the phosphorus to the zinc in the polymer composition may range from 0.01:1 to 15:1, e.g., from 0.05:1 to 10:1, from 0.1:1 to 9:1, from 0.1:1 to 2:1, from 0.1:1 to 1:1, from 0.1 to 0.75:1, from 0.2:1 to 0.75:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc to phosphorus in the polymer composition may be less than 15:1, e.g., less than 10:1, less than 9:1, less than 8:1, less than 7:1, less than 6:1, less than 5:1, less than 4:1, less than 3:1, less than 2:1, less than 1:1, or less than 0.75:1. In some cases, phosphorus is bound in the fibers/polymer along with zinc.

In one embodiment, the weight ratio of zinc to phosphorus in the polyamide composition may be greater than 1.3:1, e.g., greater than 1.4:1, greater than 1.5:1, greater than 1.6:1, greater than 1.7:1, greater than 1.8:1, or greater than 2:1. In terms of ranges, the weight ratio of zinc to phosphorus in the polyamide composition may range from 1.3:1 to 30:1, e.g., from 1.4:1 to 25:1, from 1.5:1 to 20:1, from 1.6:1 to 15:1, from 1.8:1 to 10:1, from 2:1 to 8:1, from 3:1 to 7:1, or from 4:1 to 6:1. In terms of upper limits, the weight ratio of zinc to phosphorus in the polyamide composition may be less than 30:1, e.g., less than 28:1, less than 26:1, less than 24:1, less than 22:1, less than 20:1, less than 18:1, or less than 15:1. In some aspects, there is no phosphorus in the polyamide composition. In other aspects, a very low amount of phosphorus is present. In some cases, phosphorus is held in the fibers/polymer along with zinc.

In one embodiment, the weight ratio of zinc to phosphorus in the polyamide composition may be less than 0.64:1, e.g., less than 0.62:1, less than 0.6:1, e.g., less than 0.5:1, less than 0.45:1, less than 0.4:1, less than 0.3:1, or less than 0.25:1. In terms of ranges, the weight ratio of zinc to phosphorus in the polyamide composition may range from 0.001:1 to 0.64:1, e.g., from 0.01:1 to 0.6:1, from 0.05:1 to 0.5:1, from 0.1:1 to 0.45:1, from 0.2:1 to 0.4:1, from 0.25:1 to 0.35:1, or from 0.2:1 to 0.3:1. In terms of lower limits, the weight ratio of zinc to phosphorus in the polyamide composition may be greater than 0.001:1, e.g., greater than 0.005:1, greater than 0.01:1, greater than 0.05:1, greater than 0.1:1, greater than 0.15:1, or greater than 0.2:1.

Advantageously, it has been discovered that adding the above identified zinc compounds and phosphorus compounds may result in a beneficial relative viscosity of the polymer composition. In some embodiments, the relative viscosity of the polymer composition ranges from 20 to 70, e.g., from 25 to 65, from 30 to 60, from 40 to 50, from 20 to 35, or from 25 to 32. In terms of lower limits, the relative viscosity of the polymer composition may be greater than 20, e.g., greater than 25, greater than 30, greater than 35, greater than 37.5, or greater than 40. In terms of upper limits, the relative viscosity of the polymer composition may be less than 70, e.g., less than 65, less than 60, less than 50, less than 40, or less than 35.

It has been determined that a specific amount of the zinc compound and the phosphorus compound can be mixed in a polymer composition, e.g., polyamide composition, in finely divided form, such as in the form of granules, flakes and the like, to provide a polymer composition that can be subsequently formed, e.g., extruded or otherwise drawn, into fibers by conventional methods to produce fibers having substantially improved antimicrobial activity. The zinc and phosphorus are employed in the polymer composition in the aforementioned amounts to provide a fiber with improved antimicrobial activity retention (near-permanent).

Performance Characteristics

As noted herein, by utilizing a polymer composition having the aforementioned zinc compound and phosphorus compound in the disclosed concentrations, the resultant antimicrobial fiber is capable of retaining a higher percentage of zinc, even after dyeing. The resulting yarns formed from the fibers have near-permanent antimicrobial properties.

In some embodiments, the antimicrobial fibers formed from the polymer composition have a zinc retention greater than 65% as measured by a dye bath test, e.g., greater than 75%, greater than 80%, greater than 90%, or greater than 95%. In terms of upper limits, the antimicrobial fiber has a zinc retention of less than 100%, e.g., less than 99.9%, less than 98%, or less than 95%. In terms of ranges, the antimicrobial fiber has a zinc retention in a range from 65% to 100%, e.g., from 65% to 99.9%, from 65% to 98%, from 65% to 95%, from 75% to 100%, from 75% to 99.9%, from 75% to 98%, from 75% to 95%, from 80% to 95, from 80% to 99.9%, from 80% to 99%, from 80% to 98%, from 80% to 95%, from 90% to 100%, from 90% to 99.9%, from 90% to 98%, or from 90% to 95%. In some cases, the ranges and limits relate to dye recipes having lower pH values, e.g., less than (and/or including) 5.0, less than 4.7, less than 4.6, or less than 4.5. In some cases, the ranges and limits relate to dye recipes having higher pH values, e.g., greater than (and/or including) 4.0, greater than 4.2, greater than 4.5, greater than 4.7, greater than 5.0, or greater than 5.0.

In some embodiments, the antimicrobial fibers formed from the polymer composition have a zinc retention greater than 40% after a dye bath, e.g., greater than 44%, greater than 45%, greater than 50%, greater than 55%, greater than 60%, greater than 65%, greater than 70%, greater than 75%, greater than 80%, greater than 90%, greater than 95%, or greater than 99%. In terms of upper limits, the antimicrobial fibers may have a zinc retention of less than 100%, e.g., less than 99.9%, less than 98%, less than 95% or less than 90%. In terms of ranges, the antimicrobial fiber has a zinc retention in a range from 40% to 100%, e.g., from 45% to 99.9%, from 50% to 99.9%, from 75% to 99.9%, from 80% to 99%, or from 90% to 98%. In some cases, the ranges and limits relate to dye recipes having higher pH values, e.g., greater than (and/or including) 4.0, greater than 4.2, greater than 4.5, greater than 4.7, greater than 5.0, or greater than 5.0.

In some embodiments, the antimicrobial fibers formed from the polymer composition have a zinc retention greater than 20%, e.g., greater than 24%, greater than 25%, greater than 30%, greater than 35%, greater than 40%, greater than 45%, greater than 50%, greater than 55%, or greater than 60%. In terms of upper limits, the antimicrobial fibers may have a zinc retention of less than 80%, e.g., less than 77%, less than 75%, less than 70%, less than 68%, or less than 65%. In terms of ranges, the antimicrobial fibers may have a zinc retention ranging from 20% to 80%, e.g., from 25% to 77%, from 30% to 75%, or from 35% to 70%. In some cases, the ranges and limits relate to dye recipes having lower pH values, e.g., less than (and/or including) 5.0, less than 4.7, less than 4.6, or less than 4.5.

Stated another way, in some embodiments, the antimicrobial fibers formed from the polymer composition demonstrate an extraction rate of the zinc compound less than 35% as measured by the dye bath test, e.g., less than 25%, less than 20%, less than 10%, or less than 5%. In terms of upper limits, the antimicrobial fiber demonstrates an extraction rate of the zinc compound greater than 0%, e.g., greater than 0.1%, greater than 2% or greater than 5%. In terms of ranges, the antimicrobial fiber demonstrates an extraction rate of the zinc compound from 0% to 35%, e.g., from 0% to 25%, from 0% to 20%, from 0% to 10%, from 0% to 5%, from 0.1% to 35%, from 0.1% to 25%, from 0.1% to 20%, from 0.2% to 10%, from 0.1% to 5%, from 2% to 35%, from 2% to 25%, from 2% to 20%, from 2% to 10%, from 2% to 5%, from 5% to 35%, from 5% to 25%, from 5% to 20%, or from 5% to 10%.

The zinc retention of a fiber formed from the polymer composition may be measured by a dye bath test according to the following standard procedure. A sample is cleaned (all oils are removed) by a scour process. The scour process may employ a heated bath, e.g., conducted at 82° C. for 25 minutes. A scouring solution comprising 1.0% on weight of fiber ("owf") of Sterox (723 Soap) nonionic surfactant and 3.0% owf of sodium carbonate may be used. The samples were then rinsed with water and then rinsed with cold water.

The cleaned samples may be tested according a chemical dye level procedure. This procedure may employ placing them in a dye bath comprising 1.0% owf of C.I. Acid Blue 45, 4.0% owf of MSP (monosodium phosphate), and a sufficient % owf of disodium phosphate or TSP to achieve a pH of 6.0, with a 28:1 liquor to fiber ratio. For example, if a pH of less than 6 is desired, a 10% solution of the desired acid may be added using an eye dropper until the desired pH was achieved. The dye bath may be preset to bring the bath to a boil at 100° C. The samples are placed in the bath for 1.5 hours. As one example, it may take approximately 30 minutes to reach boil and hold one hour after boil at this temperature. Then the samples are removed from the bath and rinsed. The samples are then transferred to a centrifuge for water extraction. After water extraction, the samples were laid out to air dry. The component amounts are then recorded.

In some embodiments, the zinc retention of a fiber formed from the polymer resin composition may be calculated by measuring zinc content before and after a dye bath operation. The amount of zinc retained after the dye bath may be measured by known methods. For the dye bath, an Ahiba dyer (from Datacolor) may be employed. In a particular instance, twenty grams of un-dyed fabric and 200 ml of dye liquor may be placed in a stainless steel can, the pH may be adjusted to the desired level, the stainless steel can may be loaded into the dyer; the sample may be heated to 40° C. then heated to 100° C. (optionally at 1.5° C./minute). In some cases a temperature profile may be employed, for example, 1.5° C./minute to 60° C., 1° C./minute to 80° C., and 1.5° C./minute to 100° C. The sample may be held at 100° C. for 45 minutes, followed by cooling to 40° C. at 2° C./minute, then rinsed and dried to yield the dyed product.

The antimicrobial activity of a fiber formed from the polymer composition may be measured by the standard procedure defined by ISO 20743:2013. This procedure measures antimicrobial activity by determining the percentage of a given bacterium or bacteria, e.g. S. aureus, inhibited by a tested fiber. In one embodiment, a fiber formed from the polymer composition demonstrates a Staphylococcus aureus reduction (inhibition) in an amount ranging from 60% to 100%, as measured by ISO 20743-13, e.g., from 60% to 99.99%, from 60% to 99.9%, from 60% to 99%, from 60% to 98%, from 60% to 95%, from 65% to 100%, from 65% to 99.99%, from 65% to 99.9%, from 65% to 99%, from 65% to 98%, from 65% to 95%, from 70% to 100%, from 70% to 99.99%, from 70% to 99.9%, from 70% to 99%, from 70% to 98%, from 70% to 95%, from 75% to 100%, from 75% to 99.99%, from 75% to 99.9%, from 75% to 99%, from 75% to 98%, from 75% to 95%, %, from 80% to 100%, from 80% to 99.99%, from 80% to 99.9%, from 80% to 99%, from 80% to 98%, or from 80% to 95%. In terms of lower limits, a finer formed from the polymer composition may demonstrate S. aureus reduction, e.g., greater than 60%, greater than 65%, greater than 70%, greater than 75%, or greater than 80%.

In some embodiments, antimicrobial fibers formed from the polymer resin composition demonstrate a Staphylococcus aureus reduction. The antimicrobial fibers (or the yarns or fabrics made therefrom) demonstrates a Staphylococcus aureus reduction of greater than 85%, as measured by ISO 20743-13, e.g., greater than 86%, greater than 89%, greater than 90%, greater than 92%, greater than 95%, greater than 97%, greater than 98%, greater than 99%, greater than 99.5%, or greater than 99.9%.

In some embodiments, antimicrobial fibers formed from the polymer resin composition demonstrate a Staphylococcus aureus reduction. The antimicrobial fibers (or the yarns or fabrics made therefrom) demonstrate a Staphylococcus aureus reduction (colony forming units per milliliter), as measured by ASTM E35.15 WK45351, where the yarn may be "as spun." The test may be modified to employ a single specimen (1.5 grams), 15 ml neutralizer. In such cases, the antimicrobial fibers (or the yarns or fabrics made therefrom) demonstrate a Staphylococcus aureus reduction of greater than 13%, as measured by ISO 20743-13, e.g., greater than 25%, greater than 50%, greater than 75%, greater than 80%, greater than 85%, greater than 90%, or greater than 92%.

In some embodiments, the antimicrobial fibers (or the yarns or fabrics made therefrom) demonstrate a *Staphylococcus aureus* reduction (colony forming units per milliliter), as measured by ASTM E35.15 WK45351, where the yarn may be spun into yarn, extracted with acetone, and then extracted using boiling water for one hour. In such cases, the antimicrobial fibers (or the yarns or fabrics made therefrom) demonstrates a *Staphylococcus aureus* reduction of greater than 75%, as measured by ISO 20743-13, e.g., greater than 80%, greater than 85%, greater than 90%, greater than 95%, greater than 97%, or greater than 98%.

In some embodiments, the antimicrobial fibers (or the yarns or fabrics made therefrom) demonstrate a *Staphylococcus aureus* reduction, as measured by ASTM E2149, where the yarn may be "as spun." The test may be modified to employ a single specimen (1.5 grams), 20 ml inoculum, an 8 hour incubation time. In such cases, the antimicrobial fibers (or the yarns or fabrics made therefrom) demonstrate a *Staphylococcus aureus* reduction of greater than 50%, e.g., greater than 75%, greater than 85%, greater than 90%, greater than 95%, greater than 97%, greater than 97.5%, greater than 97.8%, or greater than 99%

In some embodiments, the antimicrobial fibers (or the yarns or fabrics made therefrom) demonstrate a *Staphylococcus aureus* reduction, as measured by ASTM E2149, where the fibers may be spun into yarn, extracted with acetone, and then extracted using boiling water for one hour. The test may be modified to employ a single specimen (1.5 grams), 20 ml inoculum, an 8 hour incubation time. In such cases, the antimicrobial fibers (or the yarns or fabrics made therefrom) demonstrate a *Staphylococcus aureus* reduction of greater than 50%, e.g., greater than 55%, greater than 60%, greater than 63%, greater than 75%, greater than 80%, greater than 85%, greater than 90%, greater than 92%, greater than 95%, greater than 97%, or greater than 98%.

The antimicrobial activity of a fiber formed from the polymer composition may also be measured by determining the percentage of another bacterium or bacteria, e.g. *Klebsiella pneumoniae*, inhibited by a tested fiber. In one embodiment, a fiber formed from the polymer composition demonstrates a *Klebsiella pneumoniae* reduction in an amount ranging from 60% to 100%, e.g., from 60% to 99.99%, from 60% to 99.9%, from 60% to 99%, from 60% to 98%, from 60% to 95%, from 65% to 100%, from 65% to 99.99%, from 65% to 99.9%, from 65% to 99%, from 65% to 98%, from 65% to 95%, from 70% to 100%, from 70% to 99.99%, from 70% to 99.9%, from 70% to 99%, from 70% to 98%, from 70% to 95%, from 75% to 100%, from 75% to 99.99%, from 75% to 99.9%, from 75% to 99%, from 75% to 98%, from 75% to 95%, %, from 80% to 100%, from 80% to 99.99%, from 80% to 99.9%, from 80% to 99%, from 80% to 98%, or from 80% to 95%. In terms of upper limits, a fiber formed from the polymer composition may demonstrate a *Klebsiella pneumoniae* reduction less than 100%, e.g., less than 99.99%, less than 99.9%, less than 99%, less than 98%, or less than 95%. In terms of lower limits, a fiber formed from the polymer composition may demonstrate a *Klebsiella pneumoniae* reduction greater than 60% of, e.g., greater than 65%, greater than 70%, greater than 75%, or greater than 80%.

In some embodiments, antimicrobial fibers formed from the polymer composition demonstrate a *Klebsiella pneumoniae* reduction. The antimicrobial fibers (or the yarns or fabrics made therefrom) demonstrate a *Klebsiella pneumoniae* reduction, as measured by ISO 20743:2013, by greater than 76.1%, e.g., greater than 77%, greater than 80%, greater than 85%, greater than 90%, greater than 92%, greater than 95%, greater than 97%, greater than 98%, greater than 99%, greater than 99.5%, or greater than 99.9%.

Exemplary Formulations

In one embodiment, the zinc compound comprises zinc oxide, zinc pryithione, or zinc ammonium adipate, or combinations thereof, the phosphorus compound comprises benzene phosphinic acid, the molar ratio of the phosphorus to the zinc ranges from 0.01:1 to 3:1, the polymer composition has a relative viscosity of greater than 32, and fibers formed from the polymer composition demonstrate a retention rate of the zinc compound of greater than 85% when tested in a dye bath test.

In another embodiment, the zinc compound comprises zinc oxide, or zinc ammonium adipate, or combinations thereof, the phosphorus compound comprises benzene phosphinic acid, the molar ratio of the phosphorus to the zinc ranges from 0.01:1 to 2.5:1, the polymer composition has a relative viscosity of greater than 32, and fibers formed from the polymer composition demonstrate a retention rate of the zinc compound of greater than 88% when tested in a dye bath test.

In another embodiment, the zinc compound comprises zinc oxide, or zinc ammonium adipate, or combinations thereof, the phosphorus compound comprises benzene phosphinic acid, fibers formed from the polymer composition demonstrate a retention rate of the zinc compound of greater than 85% when tested in a dye bath test, and the polymer composition demonstrates a *Staphylococcus aureus* reduction greater than 70% as measured by ISO 20743:2013.

In yet another embodiment, the polymer comprises nylon-6,6, the zinc compound comprises zinc oxide, the molar ratio of the phosphorus to the zinc 0.5:1, and the polymer composition demonstrates a *Staphylococcus aureus* reduction greater than 75% as measured by ISO 20734:2013.

In one embodiment, the antimicrobial fibers comprise the polymer comprising less than 400 ppm of zinc, a delusterant comprising titanium dioxide, and the antimicrobial fibers demonstrates a *Staphylococcus aureus* reduction greater than 90% as measured by ISO 20743:2013.

In another embodiment, the antimicrobial fibers comprise the polymer comprising nylon-6,6, the zinc compound comprises zinc oxide and/or zinc pyrithione, the relative viscosity of the polymer composition ranges from 20 to 100, and the fibers demonstrate an extraction rate of the zinc compound less than 80% as measured by a dye bath test.

In another embodiment, the zinc compound comprises zinc ammonium adipate, fibers formed from the polymer composition demonstrate a retention rate of the zinc compound of greater than 24% when tested in a dye bath test, and the polymer composition demonstrates a *Staphylococcus aureus* reduction greater than 90% and a *Klebsiella pneumoniae* reduction greater than 95% as measured by ISO 20743:2013.

In another embodiment, the zinc compound comprises zinc ammonium adipate, fibers formed from the polymer composition demonstrate a retention rate of the zinc compound of greater than 44% when tested in a dye bath test, and the polymer composition demonstrates a *Staphylococcus aureus* reduction greater than 90% and demonstrates a *Klebsiella pneumoniae* reduction greater than greater than 95% of as measured by ISO 20743:2013.

In some embodiments, the antimicrobial agent, e.g., zinc, is added with the phosphorus compound to promote the incorporation of the antimicrobial agent into the fibers/polymer of the polymer composition. This procedure advantageously allows for more uniform dispersion of the antimicrobial agent throughout the eventual fiber. Further, this combination "builds-in" the antimicrobial within the polymer composition to help prevent or limit the active antimicrobial ingredients from being washed from the fiber.

Additional Additives

In some embodiments, the polymer composition may further comprise additional additives. For example, the polymer composition may comprise a delusterant. A delusterant additive may improve the appearance and/or texture of the synthetic fibers and fabric produced from the polymer composition. In some embodiments, inorganic pigment-like materials can be utilized as delusterants. The delusterants may comprise one or more of titanium dioxide, barium sulfate, barium titanate, zinc titanate, magnesium titanate, calcium titanate, zinc oxide, zinc sulfide, lithopone, zirconium dioxide, calcium sulfate, barium sulfate, aluminum oxide, thorium oxide, magnesium oxide, silicon dioxide, talc, mica, and the like. In preferred embodiments, the delusterant comprises titanium dioxide. It has been found that the polymer compositions that include delusterants comprising titanium dioxide produce synthetic fibers and fabrics that greatly resemble natural fibers and fabrics, e.g., synthetic fibers and fabrics with improved appearance and/or texture. It is believed that titanium dioxide improves appearance and/or texture by interacting with the zinc compound, the phosphorus compound, and/or functional groups within the polymer.

In one embodiment, the polymer composition comprises the delusterant in an amount ranging from 0.0001 wt % to 3 wt %, e.g., 0.0001 wt % to 2 wt %, from 0.0001 to 1.75 wt %, from 0.001 wt % to 3 wt %, from 0.001 wt % to 2 wt %, from 0.001 wt % to 1.75 wt %, from 0.002 wt % to 3 wt5, from 0.002 wt % to 2 w %, from 0.002 wt % to 1.75 wt %, from 0.005 wt % to 3 wt %, from 0.005 wt % to 2 wt %, from 0.005 wt % to 1.75 wt %. In terms of upper limits, the polymer composition may comprise less than 3 wt % delusterant, e.g., less than 2.5 wt %, less than 2 wt % or less than 1.75 wt %. In terms of lower limits, the polymer composition may comprise greater than 0.0001 wt % delusterant, e.g., greater than 0.001 wt %, greater than 0.002 wt %, or greater than 0.005 wt %.

In some embodiments, the polymer composition may further comprises colored materials, such as carbon black, copper phthalocyanine pigment, lead chromate, iron oxide, chromium oxide, and ultramarine blue.

In some embodiments, the polymer composition may include additional antimicrobial agents other than zinc. The additional antimicrobial agents may be any suitable antimicrobial, such as silver, copper, and/or gold in metallic forms (e.g., particulates, alloys and oxides), salts (e.g., sulfates, nitrates, acetates, citrates, and chlorides) and/or in ionic forms. In some aspects, further additives, e.g., additional antimicrobial agents, are added to the polymer composition.

Fibers and Yarns

In some embodiments, the present disclosure relates to antimicrobial fibers and yarns formed from the polymer compositions disclosed herein. The polymer compositions impart near-permanent antimicrobial properties to the resulting fibers. The antimicrobial fibers can be formed from a polymer composition having a specific amount of zinc, e.g., less than 1000 ppm (dispersed within the polymer composition) and a specific amount of phosphorus, e.g., less than less than 1000 ppm (dispersed within the polymer composition).

Fiber Diameters

In some embodiments, the fibers have an average fiber diameter less than the diameter of fibers formed for carpet-related applications, which are generally unsuitable for next-to-skin applications, For example the fibers may have an average fiber diameter less than 20 microns, e.g., less than 18 microns, less than 17 microns, less than 15 microns, less than 12 microns, less than 10 microns, less than 7 microns, less than 5 microns, less than 3 microns, or less than 2 microns.

In some embodiments, the fibers disclosed herein are micro, e.g., fibers having an average fiber diameter of greater than 1 micron. For example, the average fiber diameter of the microfibers may be greater than 1 micron, e.g., greater than 2 microns, greater than 5 microns, or greater than 10 microns. In terms of upper limits, the average fiber diameter of the microfibers may have an average fiber diameter of less than 20 microns, e.g, less than 15 microns, less than 10 microns, or less than 5 microns. In terms of ranges, the average fiber diameter of the microfibers may be from 1 to 20 microns, e.g., from 2 to 15 microns, or from 5 to 10 microns.

To the extent not indicated otherwise, test methods for determining average fiber diameters, may be by use of conventional optical microscopes which are well known in the art.

In some aspects, the polymer composition can be processed to form antimicrobial fibers having lower denier levels. As noted above, some carpet-related references have disclosed an antimicrobial nylon prepared in water with a zinc compound and phosphorus compound. These references, however disclose higher denier levels (for example, greater than 12 dpf) and/or higher fiber diameter (for example, greater than 20 microns) fibers/filaments, e.g., carpet fibers and are not relevant to fibers/fabrics for next-to-skin end applications As used herein, "denier per filament" or "dpf" refers to the fiber thickness for an individual filament, e.g., a monofilament. In some aspects, the antimicrobial fiber has a denier less than 12 dpf, e.g., less than 10 dpf, less than 8 dpf, less than 6 dpf, less than 5 dpf, less than 4 dpf, less than 3 dpf, less than 2 dpf, or less than 1 dpf. In terms of ranges, the antimicrobial fiber has a denier in range from 0.1 dpf to 12 dpf, e.g., from 0.5 dpf to 10 dpf, from 0.1 dpf to 5 dpf, from 0.1 dpf to 3 dpf, from 0.1 dpf to 2 dpf, from 0.5 dpf t 3 dpf, from 1 dpf to 8 dpf, from 2 dpf to 6 dpf, from 3 dpf to 5 dpf. In terms of lower limits, the antimicrobial fiber has a denier greater than 0.1 dpf, e.g., greater than 0.5 dpf, greater than 0.8 dpf, greater than 1 dpf, greater than 2 dpf, greater than 4 dpf, or greater than 6 dpf.

Processes for Making Fibers and Yarns

In some embodiments, the present disclosure provides a process for imparting near-permanent antimicrobial properties to fibers, yarns, and fabrics made from the polymer composition described herein. In some aspects, the fibers, e.g., polyamide fibers, are made by extruding a polymer formed in a melt polymerization process. During the melt polymerization process of the polymer composition, an aqueous monomer solution, e.g., salt solution, is heated under controlled conditions of temperature, time and pressure to evaporate water and effect polymerization of the monomers, resulting in a polymer melt. During the melt polymerization process, sufficient amounts of a zinc compound and a phosphorus compound are employed in the aqueous monomer solution to form the polymer composition before polymerization. After the zinc compound and the phosphorus compound are present in the aqueous monomer solution, the polymer composition may be polymerized. The polymerized polymer can subsequently be extruded into fibers.

In some embodiments, the process for preparing an antimicrobial fiber having near-permanent antimicrobial properties from the polymer composition includes preparing an aqueous monomer solution, adding from 10 wppm to 1000 wppm of zinc in a zinc compound dispersed within the aqueous monomer solution, and adding from 0.01 wt % to 1 wt % of phosphorus in a phosphorus compound, polymerizing the aqueous monomer solution to form a polymer melt, and extruding the polymer melt to form an antimicrobial fiber. In this embodiment, the polymer composition comprises the resultant aqueous monomer solution after zinc and phosphorus are added. In some aspects, the polymer melt can be extruded to form an antimicrobial fiber having a denier per filament as mentioned above.

In some embodiments, the process includes preparing an aqueous monomer solution. The aqueous monomer solution may comprise amide monomers. In some embodiments, the concentration of monomers in the aqueous monomer solution is less than 60 wt %, e.g., less than 58 wt %, less than 56.5 wt %, less than 55 wt %, less than 50 wt %, less than 45 wt %, less than 40 wt %, less than 35 wt %, or less than 30 wt %. In some embodiments, the concentration of monomers in the aqueous monomer solution is greater than 20 wt %, e.g., greater than 25 wt %, greater than 30 wt %, greater than 35 wt %, greater than 40 wt %, greater than 45 wt %, greater than 50 wt %, greater than 55 wt %, or greater than 58 wt %. In some embodiments, the concentration of monomers in the aqueous monomer solution is in a range from 20 wt % to 60 wt %, e.g., from 25 wt % to 58 wt %, from 30 wt % to 56.5 wt %, from 35 wt % to 55 wt %, from 40 wt % to 50 wt %, or from 45 wt % to 55 wt %. The balance of the aqueous monomer solution may comprise water and/or additional additives. In some embodiments, the monomers comprise amide monomers including a diacid and a diamine, i.e., nylon salt.

In some embodiments, the aqueous monomer solution is a nylon salt solution. The nylon salt solution may be formed by mixing a diamine and a diacid with water. For example, water, diamine, and dicarboxylic acid monomer are mixed to form a salt solution, e.g., mixing adipic acid and hexamethylene diamine with water. In some embodiments, the diacid may be a dicarboxylic acid and may be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenyl enediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof. In some embodiments, the diamine may be selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, $C_2$-$C_{16}$ aliphatic diamine optionally substituted with one or more $C_1$ to $C_4$ alkyl groups, aliphatic polyether diamines and furanic diamines, such as 2,5-bis(aminomethyl)furan, and mixtures thereof. In preferred embodiments, the diacid is adipic acid and the diamine is hexamethylene diamine which are polymerized to form nylon 6,6.

It should be understood that the concept of producing a polyamide from diamines and diacids also encompasses the concept of other suitable monomers, such as, aminoacids or lactams. Without limiting the scope, examples of aminoacids can include 6-aminohaxanoic acid, 7-aminoheptanoic acid, 11-aminoundecanoic acid, 12-aminododecanoic acid, or combinations thereof. Without limiting the scope of the disclosure, examples of lactams can include caprolactam, enantholactam, lauryllactam, or combinations thereof. Suitable feeds for the disclosed process can include mixtures of diamines, diacids, aminoacids and lactams.

Of course, as noted above, polyamides are only one type of polymer that may be utilized in the disclosed process. In addition, other polymerization reactants/reactions are contemplated.

After the aqueous monomer solution is prepared, a zinc compound and a phosphorus compound are added to the aqueous monomer solution to form the polymer composition. In some embodiments, less than 1000 ppm of zinc is dispersed within the aqueous monomer solution. In some aspects, further additives, e.g., additional antimicrobial agents, are added to the aqueous monomer solution.

In some cases, the polymer composition is polymerized using a conventional melt polymerization process. In one aspect, the aqueous monomer solution is heated under controlled conditions of time, temperature, and pressure to evaporate water, effect polymerization of the monomers and provide a polymer melt. In some aspects, the use of the zinc compound and the phosphorus compound may advantageously improve the relative viscosity of the polymer composition, diminish the extraction rate of the zinc compound during dyeing, and, and enhance its dyeability of the resultant antimicrobial fiber.

In some aspects, an antimicrobial nylon is prepared by a conventional melt polymerization of a nylon salt. Typically, the nylon salt solution is heated under pressure (e.g. 250 psig/1825×$10^3$ n/$m^2$) to a temperature of, for example, about 245° C. Then the water vapor is exhausted off by reducing the pressure to atmospheric pressure while increasing the temperature to, for example, about 290° C. Before polymerization, zinc and, optionally, phosphorus be added to the nylon salt solution. The resulting molten nylon is held at this temperature for a period of time to bring it to equilibrium prior to being extruded into a fiber. In some aspects, the process may be carried out in a batch or continuous process. In some embodiments, the formed nylon melt is extruded to form an antimicrobial nylon fiber having a denier less than 12 dpf.

In some embodiments, during melt polymerization, the zinc compound, e.g., zinc oxide, and the phosphorus compound, e.g., benzene phosphinic acid, are added to the aqueous monomer solution. The antimicrobial fiber may comprise a polyamide that is made in a melt polymerization process and not in a master batch process. In some aspects, the resulting fiber has near-permanent antimicrobial properties. The resulting fiber can be used for applications such as, e.g., socks, heavy hosiery, and shoes.

The antimicrobial agent may be added to the polyamide during melt polymerization, and thereafter, the fiber may be formed from extrusion. Of course, other fiber forming methods are also contemplated. The formed fibers may be spun to form a resultant yarn to be used in knitting and/or weaving to provide the antimicrobial properties in the fabrics. While polyamide may be used to explain one aspect of the disclosure, it is understood that numerous polymers may be used herein without deviating from the present scope of the disclosure.

A fabric can be made from the fibers. Garments made from these fabrics can withstand normal wear, and is devoid of any coated, doped, or topical treatment, which tends to abrade off during knitting and weaving. The abrasion process results in dust on machines and fabric, and lowers the effective use time of garments in normal wear and laundering.

In some embodiments, the polymer composition is extruded in order to create a fiber. The extrusion process itself depends on the temperature of the mixture being sufficiently high to melt the mixture. A melting step may be a separate step or it may be part of either the mixing process or the extruding process. When the mixture is at a sufficiently high temperature, the mixture may be extruded using conventional mechanisms. The fiber may then be drawn, crimped, cut and spun into a yarn or other fabric depending on the intended end use. In some embodiments, the yarn is then dyed.

In some embodiments, the yarn is dyed at a pH of at least 4.0, e.g., at least 4.1, at least 4.2, at least 4.3, at least 4.4, at least 4.5, at least 4.6, at least 4.7, at least 4.8, at least 4.9, at least 5.0, at least 5.2, at least 5.4, at least 5.6, at least 5.8, at least 6.0, least 6.2, at least 6.4, at least 6.6, or at least 6.8. In some embodiments, the yarn is then dyed at a pH less than 7.0, e.g., less than 6.9, less than 6.8, less than 6.7, less than 6.6 less than 6.5, less than 6.4 less than 6.2, less than 6.0, less than 5.5, less than 5.0, or less than 4.5. In some embodiments, the yarn is then dyed at a pH in a range from 4.0 to 7.0, e.g., from 4.2 to 6.8, from 4.4 to 6.6, from 4.6 to 6.4, from 4.8 to 6.2, from 5.0 to 6.0, from 5.2 to 5.8, or from 5.4 to 5.6.

In some cases, it was unexpectedly found that dyeing the yarn at a pH of at least 5.0 does not extract any significant amounts of the antimicrobial agent from the polymer composition. In conventional processes, additives tend to be removed from the fiber during subsequent finishing operations, such as, scouring or dyeing of the fiber. For example, if zinc is omitted from the polymer, phosphorus tends to be removed from the fiber during subsequent finishing operations, such as, scouring or dyeing of the fiber.

EXAMPLES

Examples 1-4 and Comparative Examples A and B

Fibers were prepared using nylon-6,6 (~98.4 wt % nylon-6,6), zinc compound (zinc ammonium adipate zinc ammonium adipate (a mixture of ammonium adipate, zinc oxide, and optionally water)), and titanium dioxide with a phosphorus-containing coating (~1.6 wt % titanium dioxide). The nylon 6,6 polymer was made by a batch process in which nylon 6,6 salt was processed in an evaporator to achieve the desired concentration, and then polymerized in an autoclave using a typical four step process. The zinc ammonium adipate was added to the salt solution in an evaporation step before polymerization (so as to achieve the zinc levels indicated in Table 1). Titanium dioxide (containing phosphorus) was added when the concentrated salt was transferred from the evaporator to the autoclave (so as to achieve the phosphorus levels indicated in Table 1). The polymers were then spun into yarn at approximately 4,600 meters per minute, and then drawn further until the final denier per filament was about 2 dpf and the average diameter of the fibers was less than 20 microns. The yarn was textured and made into fabric, and was dyed using the 13 recipes shown in Table 2. The dyed fabrics were tested for zinc retention and for antimicrobial efficacy (according to ISO20743:2013).

TABLE 1

Formulations

| | Ex./Comp. Ex. | | | | | |
|---|---|---|---|---|---|---|
| | A | B | 1 | 2 | 3 | 4 |
| N-6.6, wt % | ~98.4 | ~98.4 | ~98.4 | ~98.4 | ~98.4 | ~98.4 |
| Titanium dioxide, wt % | ~1.6 | ~1.6 | ~1.6 | ~1.6 | ~1.6 | ~1.6 |
| Zn (ppm) | —* | —* | 356 | 346 346-498 | 466 300-500 | 498 |
| P (ppm) | 78 | 78 | 78 | 77 | 79 | 108 |
| Zn:P weight ratio | ~0 | ~0 | 4.56 | 4.49 | 5.90 | 4.61 |
| P:Zn molar ratio | | | 0.46 | 0.47 | 0.36 | 0.46 |
| Denier (dpf) | 2 | 1 | 2 | 1 | 2 | 1 |

*Comparative Examples A and B had negligible zinc levels, if any (the Zn:P ratio was close to zero); in some cases, the dye recipe contained minute amounts of zinc, which affected retention numbers - these results were discarded

TABLE 2

Dye Recipes

| Dye recipe | I | II | III | IV | V | VI | VII |
|---|---|---|---|---|---|---|---|
| Dye type | 1, 2, 3 | 1, 2, 3 | 4, 5, 6 | 4, 5, 6 | 7, 8 | 7, 8 | 9, 10, 11 |
| pH | 5.0-5.5 | 5.0-5.5 | 4.0-4.5 | 4.0-4.5 | 4.0-4.5 | 4.0-4.5 | 3.3-3.7 |
| Acid | Acetic | Opticid | Acetic | Opticid | Acetic | Opticid | Citric |

| Dye recipe | VIII | IX | X | XI | XII | XIII |
|---|---|---|---|---|---|---|
| Dye type | 12, 13, 14 | 12, 13, 14 | 13, 14, 15 | 13, 14, 15 | 16, 2, 17 | 16, 2, 17 |
| pH | 5.0-5.5 | 5.0-5.5 | 5.0-5.5 | 5.0-5.5 | 5.0-5.5 | 5.0-5.5 |
| Acid | Acetic | Opticid | Acetic | Opticid | Acetic | Opticid |

* Opticid is an acid donor

| | Dyes |
|---|---|
| 1 | Optilan Golden Yellow MF-RL |
| 2 | Nylosan Red N-2RBL |
| 3 | Nylosan Blue N-BLN |
| 4 | Nylosan Yellow S-L |
| 5 | Nylosan Red S-3B |
| 6 | Nylosan Blue S-R |
| 7 | Lanasyn Dark Brown M-GLN |
| 8 | Lanasyn Black S-DL-C 120 |
| 9 | Nylosan Yellow E-4G 200 |
| 10 | Nylosan Rhaodamine B300 |
| 11 | Nylosan Violet E-2R 300 |
| 12 | Nylosan Yellow E-2RL |
| 13 | Nylosan Red E-BNLC 180 |
| 14 | Nylosan Blue E-BGL 200 |
| 15 | Nylosan Yellow E-4G 200 |
| 16 | Optilan Golden Yellow MF-RL |
| 17 | Nylosan Br Blue N-FLB 180 |

Zinc retention of Examples 1-4 was calculated by measuring zinc content before and after a dye bath using an Ahiba dyer (from Datacolor). For the dye bath, 200 ml of dye liquor were placed in a stainless steel can, the pH was adjusted to the desired level. 20 grams of un-dyed fabric were placed in the stainless steel can, which was loaded into the dyer. The sample was heated to 40° C., then heated to 100° C. (at 1.5° C./minute). The sample was held at 100° C. for 40 minutes, and then cooled to 40° C. at 2° C./minute; and rinsed and dried to yield the dyed product.

Comparative Examples A and B contained only negligible amounts of zinc, so retention numbers were not measured. Zinc retention results for Examples 1-4 are shown in Tables 3 and 4.

TABLE 3

Zinc Retention (ppm)

| Ex. | Dye recipe | | | | | |
|---|---|---|---|---|---|---|
| | I | II | III | IV | V | VI |
| 1 | 334 | 225 | 166 | 117 | 241 | 213 |
| 2 | 294 | 207 | 179 | 110 | 253 | 227 |
| 3 | 443 | 273 | 236 | 154 | 355 | 311 |
| 4 | 448 | 227 | 232 | 127 | 337 | 308 |

| Ex. | Dye recipe | | | | | | |
|---|---|---|---|---|---|---|---|
| | VII | VIII | IX | X | XI | XII | XIII |
| 1 | 96.8 | 377 | 252 | 388 | 242 | 345 | 277 |
| 2 | 110 | 336 | 224 | 524 | 247 | 305 | 221 |
| 3 | 188 | 416 | 315 | 431 | 320 | 445 | 288 |
| 4 | 121 | 463 | 251 | 404 | 287 | 472 | 284 |

TABLE 4

Zinc Retention %

| Ex. | Dye recipe | | | | | | |
|---|---|---|---|---|---|---|---|
| | I | II | III | IV | V | VI | VII |
| 1 | 93.8% | 63.2% | 46.6% | 32.9% | 67.7% | 59.8% | 27.2% |
| 2 | 85.0% | 59.8% | 51.7% | 31.8% | 73.1% | 65.6% | 31.8% |
| 3 | 95.1% | 58.6% | 50.6% | 33.0% | 76.2% | 66.7% | 40.3% |
| 4 | 90.0% | 45.6% | 46.6% | 25.5% | 67.7% | 61.8% | 24.3% |

| Ex. | VIII | IX | X | XI | XII | XIII |
|---|---|---|---|---|---|---|
| 1 | 105.9% | 70.8% | 109.0% | 68.0% | 96.9% | 77.8% |
| 2 | 97.1% | 64.7% | 151.4% | 71.4% | 88.2% | 63.9% |

TABLE 4-continued

Zinc Retention %

| 3 | 89.3% | 67.6% | 92.5% | 68.7% | 95.5% | 61.8% |
|---|---|---|---|---|---|---|
| 4 | 93.0% | 50.4% | 81.1% | 57.6% | 94.8% | 57.0% |

As shown, the Examples that utilized particular combinations of zinc and phosphorus, (with at least some zinc being present), demonstrated excellent zinc retention. All of the Examples demonstrated zinc retention above 24%, which is an amount sufficient to reduce microbial activity (see *Klebsiella pneumoniae* and *Staph aureus* discussion below). In most cases, zinc retention was well over 50%. In particular, the Examples demonstrated zinc retention above 44%, and in most cases well over 50%, when employed with a dye recipe having higher pH values, e.g., over 4 (see Examples I, II, and VIII-XIII).

Examples 1-4 and Comparative Examples A and B were also tested for antimicrobial efficacy (*Klebsiella pneumoniae* and *Staph Aureus*) according to ISO20743:2013. The results are shown in Table 5.

TABLE 5

Antimicrobial efficacy

| Ex./Comp. Ex. | Dye recipe | | | | | | |
|---|---|---|---|---|---|---|---|
| | I | II | III | IV | V | VI | VII |
| | *Klebsiella pneumoniae* Reduction, % | | | | | | |
| 1 | >99.9 | >99.9 | >99.9 | >99.9 | >99.9 | >99.9 | >99.9 |
| 2 | >99.9 | >99.9 | >99.9 | 97.8 | >99.9 | >99.9 | >99.9 |
| 3 | >99.9 | >99.9 | >99.9 | >99.9 | >99.9 | >99.9 | >99.9 |
| 4 | >99.9 | >99.9 97.8 | >99.9 | >99.9 | >99.9 | >99.9 | >99.9 |
| A | 25.1 | 29.7 | 28.4 | 50.0 | 46.4 | 46.2 | 46.7 |
| B | 27.5 | 40.7 | 29.0 | 76.1 | 54.6 | 54.9 | 54.8 |
| | *Staphylococcus aureus* Reduction, % | | | | | | |
| 1 | >99.9 | 97.9 | 99.7 | 97.2 | >99.9 | >99.9 | 93.9 |
| 2 | >99.9 | >99.9 | >99.9 | 92.4 | >99.9 | >99.9 | >99.9 |
| 3 | >99.9 | >99.9 | >99.9 | 99.1 | >99.9 | >99.9 | 89.4 |
| 4 | >99.9 | >99.9 | >99.9 | 99.9 | >99.9 | >99.9 | 95.4 |
| A | 0 | 0 | 7.6 | 78.9 | 57.2 | 70.8 | 0 |
| B | 0 | 0 | 0 | 85.4 | 43.2 | 54.3 | 0 |

Importantly, along with the superior zinc retention performance, the formulations of Examples 1-4 demonstrated significant antimicrobial activity in terms of *Klebsiella pneumoniae* reduction and *Staphylococcus aureus* reduction. As shown in Table 5, *Klebsiella pneumoniae* reduction was well over 95% and *Staphylococcus aureus* reduction was generally well over 90%. In contrast, Comparative Examples A and B demonstrated *Klebsiella pneumoniae* reductions of 76% at most, with most results ranging from 25% to 55%, which is well below required levels. In terms of *Staphylococcus aureus* reduction, Comparative Examples A and B demonstrated 85% reductions at most, with most ranging from 0% to 70%, which is well below required levels.

Examples 5 and 6 and Comparative Example C

Fibers containing zinc compound and phosphorus compound were prepared and tested. The zinc and phosphorus content of the respective examples were as shown in Table 6. Nylon 6,6 polymer was made by a batch process in which nylon 6,6 salt was processed in a evaporator to achieve the desired concentration, and then polymerized in an autoclave using a typical four step process. The antimicrobial zinc polymer additive was added to the salt solution in an evaporation step before polymerization, and 1.6 wt % $TiO_2$ was added when the concentrated salt was transferred from the evaporator to the autoclave. The $TiO_2$ was coated with a phosphorus-containing coating. The polymers were then spun into yarn at approximately 2,200 meters per minute, and then drawn further until the final denier per filament was about 2 dpf and the average diameter of the fibers was less than 16 micron. The antimicrobial (anti-bacterial) properties of Examples 5 and 6 and Comparative Example C were tested for *Staphylococcus aureus* activity according to 2 test standards: ASTM E35.15 WK45351 modified* (standard 1) and ASTM E2149 modified** (standard 2).

Each test standard utilized two separate treatments: Treatment 1 tested "as-spun" yarn and Treatment 2 tested yarn that was first extracted with acetone, and then was extracted using boiling water for one hour. Colony forming units were measured. Comparative Example C, which did not contain any zinc compound and had a zinc:phosphorus ratio of 0, represents a baseline for antimicrobial properties. The results are shown in Table 6.

ment 1, and 95.12% and 98.18% reductions when tested under Treatment 2.

Also as shown in Table 6, for Standard 2, Examples 5 and 6 demonstrated 97.88% and ~100% reductions in *Staphylococcus aureus*, respectively, when tested under Treatment 1, and 63.77% and 98.55% reductions when tested under Treatment 2.

Importantly, both the average fiber diameter and the dpf were low, so the fibers and the resultant products formed therefrom were suitable for to next-to-skin textiles, unlike coarse, conventional carpet fibers, which have significantly higher denier and fiber diameter.

Examples 7-11 and Comparative Examples D-F

Fibers comprising nylon-6,6, zinc in a zinc compound, and phosphorus in a phosphorus compound were prepared and tested, as described above, with the exception that phosphorus was provided via a phosphorus compound (benzene phosphinic acid). The prepared polymer compositions

TABLE 6

Formulations and Results

|  | C | 5 | 6 |
|---|---|---|---|
| N-6,6, wt % | ~98.4 | ~98.4 | ~98.4 |
| Titanium dioxide, wt % | ~1.6 | ~1.6 | ~1.6 |
| Zn (ppm) | 0 | 327 | 478 |
| P (ppm) | 74 | 73 | 76 |
| Zn:P ratio | 0 | 4.3 | 6.5 |
| Denier (dpf) | 2 | 2 | 2 |

Standard 1

|  | CFU***/ml | CFU/ml (% Reduction) | CFU/ml (% Reduction) |
|---|---|---|---|
| Treatment 1 | 55,400 | 48,000 (13.36%) | 4,070 (92.65%) |
| Treatment 2 | 213,000 | 10,400 (95.12%) | 3,870 (98.18%) |

Standard 2

|  | CFU/ml | CFU/ml (% Reduction) | CFU/ml (% Reduction) |
|---|---|---|---|
| Treatment 1 | 690.000 | 14.600 (97.88%) | 30 (99.87%) |
| Treatment 2 | 2.070 | 750 (63.77%) | 30 (98.55%) |

* Single specimen, 1.5 gram specimen, 15 ml neutralizer, test performed once
** Single specimen, 1.5 gram specimen, 20 ml of inoculum, 8 hour incubation time, test performed once
***CFU—Colony Forming Units As shown in Table 6, for Standard 1, Examples 5 and 6 demonstrated 13.36% ((55,400-48,000)/55,400) and 92.65% reductions in *Staphylococcus aureus* (as compared to Comparative Example C) respectively, when tested under Treatment 1, and 95.12% and 98.18% reductions when tested under Treatment 2.

were then spun into yarn using a spinneret attached to the autoclave. The components of the tested compositions, including the zinc and phosphorus content, the molar ratio of the phosphorus to the zinc in each composition, are shown in Table 7.

TABLE 7

Formulations

| | Ex./Comp. Ex. | | | | | | | |
|---|---|---|---|---|---|---|---|---|
|  | D | E | F | 7 | 8 | 9 | 10 | 11 |
| N-6,6, wt % | balance | balance | balance | balance | balance | balance | balance | balance |
| Zn (ppm); ZnO and/or ZnAA | 323 (ZnO) | 324 (ZnAA) | 651 (ZnO/ZnAA) | 327 (ZnO) | 371 (ZnO) | 327 (ZnAA) | 329 (ZnAA) | 705 (ZnO/ZnAA) |
| P (ppm); BPA | ~0 | ~0 | ~0 | 166 | 344 | 348 | 181 | 1700 |

TABLE 7-continued

| | Formulations | | | | | | | |
|---|---|---|---|---|---|---|---|---|
| | Ex./Comp. Ex. | | | | | | | |
| | D | E | F | 7 | 8 | 9 | 10 | 11 |
| Zn:P weight ratio | 100+ | 100+ | 100+ | 2.0 | 1.1 | 0.9 | 1.8 | 0.4 |
| P:Zn molar ratio | ~0 | ~0 | ~0 | 1.0 | 2.0 | 2.0 | 1.0 | 5.0 |
| Denier (dpf) | | | | | | | | |

*Comparative Examples D-F had negligible phosphorus levels

As shown in Table 7, Examples 7-11 comprise zinc compound(s) and phosphorus compound(s). Comparative Examples D, E, and F comprise essentially no phosphorus compound.

The performance characteristics of the tested polymer compositions are shown in Table 2. The relative viscosity was measured by a standard procedure. The retention rate of the zinc compound was measured twice in a dye bath test using a citric acid (pH 4) bath and an acetic acid (pH 5) bath, respectively. The results are shown in Table 8.

TABLE 8

| | | Zn Retention Rate | |
|---|---|---|---|
| Ex./Comp. Ex | Rel. Viscosity | Citric (4 pH) | Acetic (5 pH) |
| 7 | 40.6 | 95.1% | 96.6% |
| 8 | 40.3 | 88.4% | 92.2% |
| 9 | 33.6 | 93.6% | 101.5%* |
| 10 | 32.2 | 93.3% | 100.6%* |
| 11 | 38.1 | 90.3% | 89.1% |
| D | 33.8 | 72.4% | 70.6% |
| E | 30.7 | 61.4% | 62.6% |
| F | 32.4 | 67.6% | 67.1% |

*some examples picked up zinc due to residual amounts in the equipment

As shown in Table 8, Examples 7 and 8 demonstrated high relative viscosity values, e.g., 40.6 and 40.3, respectively, as compared to Comparative Example D, which had a similar composition but did not include a phosphorus compound (20.20% and 19.46% increases in relative viscosity vs. Comparative Example D).

Examples 7 and 8 also demonstrated significantly higher zinc retention rates, e.g., ranging from 88.4% to 96.6%, as compared to those of Comparative Example D, e.g., ranging from 70.6% to 72.4%. These numbers were 31.3% and 22.1% improvements, respectively, in the zinc extraction rates when tested in citric acid and 36.8% and 30.6% improvements, respectively, when tested in acetic acid.

As shown in Table 8, Examples 9 and 10 demonstrated high relative viscosity values, e.g., 33.6 and 32.2, respectively, as compared to Comparative Example D, which had a similar composition but did not include a phosphorus compound (9.35% and 4.76% increases in relative viscosity vs. Comparative Example E).

Examples 9 and 10 also demonstrated significantly higher zinc retention rates, e.g., ranging from 93.3% to ~100%, as compared to those of Comparative Example E, e.g., ranging from 61.4% to 62.6%. These numbers were 52.4% and 51.9% improvements, respectively, in the zinc extraction rates when tested in citric acid 59.7% improvements, respectively, when tested in acetic acid.

As shown in Table 8, Example 11 demonstrated a high relative viscosity value, e.g., 38.1, as compared to Comparative Example F, which had a similar composition but did not include a phosphorus compound (17.65% increase in relative viscosity vs. Comparative Example F).

Example 11 also demonstrated significant higher zinc retention rates, e.g., ranging from 89.1% to 90.3%, as comparted to those of Comparative Example F, e.g., ranging from 67.1% to 67.6%. These numbers were a 33.6% improvement in the zinc extraction rates when tested in citric acid and 32.88% improvement when tested in acetic acid.

Furthermore, as shown in Table 9, each of the tested polymer compositions demonstrated high rates of antimicrobial activity, e.g., *Klebsiella pneumoniae* reduction ranging from 90.6% to >99.9% and *Staphylococcus aureus* reduction ranging from 59.45 to 98.4%. The antimicrobial properties were tested according to ISO 20743:2013.

TABLE 9

| | Antimicrobial Effect | | | |
|---|---|---|---|---|
| Ex./Comp. Ex | K. pneumoniae | Log Reduction | S. aureus | Log Reduction |
| 7 | 90.6% | 1.1 | 78.2% | 0.6 |
| 8 | 99.9% | 2.1 | 98.4% | 1.8 |
| 9 | 99.9% | 2.1 | 88.8% | 0.9 |
| 10 | 98.3% | 1.8 | 59.4% | 0.4 |
| 11 | >99.9% | 3.6 | 97.5% | 1.6 |

EMBODIMENTS

The following embodiments are contemplated. All combinations of features and embodiments are contemplated.

Embodiment 1: A polymer composition having antimicrobial properties, the composition comprising: from 50 wt % to 99.9 wt % of a polymer, from 10 wppm to 1000 wppm of zinc, and from 0.01 wt % to 1 wt % of phosphorus, wherein fibers formed from the polymer composition demonstrate an extraction rate of the zinc compound of less than 35% when tested in a dye bath test and/or a zinc retention rate of greater than 65%

Embodiment 2: An embodiment of embodiment 1, wherein the molar ratio of the phosphorus to the zinc is at least 0.01:1.

Embodiment 3: An embodiment of embodiment 1 or 2, wherein the polymer composition has a relative viscosity of at least 25.

Embodiment 4: An embodiment of any of embodiments 1-3, further comprising a delusterant comprising a titanium compound.

Embodiment 5: An embodiment of any of embodiments 1-4, wherein the delusterant is present in an amount ranging from 1.2 wt % to 2.0 wt %; and wherein at least a portion of the delusterant interacts with the zinc compound.

Embodiment 6: An embodiment of any of embodiments 1-5, wherein fibers formed from the polymer composition demonstrate an extraction rate of the zinc compound of less than 25% when tested in a dye bath test.

Embodiment 7: An embodiment of any of embodiments 1-6, wherein the phosphorus compound comprises benzene phosphinic acid, phosphorous acid, or manganese hypophosphite, or combinations thereof.

Embodiment 8: An embodiment of any of embodiments 1-7, wherein the zinc compound comprises zinc oxide, zinc ammonium adipate, zinc acetate, or zinc pyrithione, or combinations thereof.

Embodiment 9: An embodiment of any of embodiments 1-8, wherein the zinc compound comprises zinc oxide.

Embodiment 10: An embodiment of any of embodiments 1-9, wherein the polymer composition demonstrates *S. aureus* reduction greater than 75% as measured by ISO 20743:2013.

Embodiment 11: An embodiment of any of embodiments 1-10, wherein the polymer composition demonstrates *K. pneumonia* reduction greater than 90% as measured by ISO 20743:2013.

Embodiment 12: An embodiment of any of embodiments 1-11, wherein the zinc compound comprises zinc oxide and wherein the polymer composition has a relative viscosity of at least 37.5.

Embodiment 13: An embodiment of any of embodiments 1-12, wherein the zinc compound comprises zinc oxide, zinc pyrithione, or zinc ammonium adipate, or combinations thereof; wherein the phosphorus compound comprises benzene phosphinic acid; wherein the molar ratio of the phosphorus to the zinc ranges from 0.01:1 to 3:1; wherein the polymer composition has a relative viscosity of at least 32; and wherein fibers formed from the polymer composition demonstrate an extraction rate of the zinc compound of less than 15% when tested in a dye bath test.

Embodiment 14: An embodiment of any of embodiments 1-13, wherein the zinc compound comprises zinc oxide; wherein the phosphorus compound comprises benzene phosphinic acid; wherein the molar ratio of the phosphorus to the zinc ranges from 0.01:1 to 2.5:1; wherein the polymer composition has a relative viscosity of at least 40; and wherein fibers formed from the polymer composition demonstrate an extraction rate of the zinc compound of less than 12% when tested in a dye bath test.

Embodiment 15: An embodiment of any of embodiments 1-14, wherein the zinc compound comprises zinc ammonium adipate; wherein fibers formed from the polymer composition demonstrate an extraction rate of the zinc compound of less than 15% when tested in a dye bath test; and wherein the polymer composition demonstrates *S. aureus* reduction greater than 95% as measured by ISO 20743:2013.

Embodiment 16: An embodiment of any of embodiments 1-15, where in the zinc compound comprises zinc oxide and zinc ammonium adipate; wherein the phosphorus compound comprises benzene phosphinic acid; wherein the molar ratio of the phosphorus to the zinc ranges from 0.01:1 to 2.5:1; wherein the polymer composition has a relative viscosity of at least 32; and wherein fibers formed from the polymer composition demonstrate an extraction rate of the zinc compound of less than 15% when tested in a dye bath test.

Embodiment 17: An embodiment of any of embodiments 1-16, wherein the dye bath test comprises a liquid solution at a pH less than 5.

Embodiment 18: A method for making antimicrobial fibers comprising: providing a polymer composition having antimicrobial properties, the composition comprising from 50 wt % to 99.9 wt % of a polymer, from 10 wppm to 1000 wpppm of zinc in a zinc compound, and from 0.01 to 1 wt % of phosphorus in a phosphorus compound, and forming the polymer composition into fibers.

Embodiment 19: An embodiment of embodiment 18, wherein the fibers demonstrate an extraction rate of the zinc compound of less than 35% when tested in a dye bath test.

Embodiment 20: An embodiment of embodiment 18 or 19, wherein polymer composition has a relative viscosity of at least 25.

Embodiment 21: An embodiment of any of embodiments 18-20, wherein the molar ratio of the phosphorus to the zinc in the polymer composition is at least 0.01:1.

Embodiment 22: An embodiment of any of embodiments 18-21, wherein the molar ratio of the phosphorus to the zinc in the polymer composition is at least 0.5:1.

Embodiment 23: A polymer composition having antimicrobial properties, the composition comprising: from 50 wt % to 99.9 wt % of a polymer, from 5 wppm to 1000 wppm of zinc, and from 0.005 wt % to 1 wt % of phosphorus, wherein fibers formed from the polymer composition demonstrate a zinc retention rate of greater than 20% when tested in a dye bath test.

Embodiment 24: An embodiment of embodiment 23, wherein the molar ratio of the phosphorus to the zinc is at least 0.01:1.

Embodiment 25: An embodiment of embodiment 23 or 24, wherein the polymer composition has a relative viscosity of at least 25.

Embodiment 26: An embodiment any of embodiments 23-25, further comprising a delusterant comprising a titanium compound.

Embodiment 27: An embodiment any of embodiments 23-26, wherein the delusterant is present in an amount ranging from 1.2 wt % to 2.0 wt %; and wherein at least a portion of the delusterant interacts with the zinc compound.

Embodiment 28: An embodiment any of embodiments 23-27, wherein fibers formed from the polymer composition demonstrate a zinc retention rate greater than 24% when tested in a dye bath test.

Embodiment 29: An embodiment any of embodiments 23-28, wherein the phosphorus compound comprises benzene phosphinic acid, phosphorous acid, or manganese hypophosphite, or combinations thereof.

Embodiment 30: An embodiment any of embodiments 23-29, wherein the zinc compound comprises zinc oxide, zinc ammonium adipate, zinc acetate, or zinc pyrithione, or combinations thereof.

Embodiment 31: An embodiment of any of embodiments 23-30, wherein the zinc compound comprises zinc oxide.

Embodiment 32: An embodiment any of embodiments 23-31, wherein the polymer composition demonstrates a *Staphylococcus aureus* reduction greater than 75% as measured by ISO 20743:2013.

Embodiment 33: An embodiment any of embodiments 23-32, wherein the polymer composition demonstrates a *Klebsiella pneumoniae* reduction greater than 90% as measured by ISO 20743:2013.

Embodiment 34: An embodiment any of embodiments 23-33, wherein the zinc compound comprises zinc oxide and wherein the polymer composition has a relative viscosity of at least 37.5.

Embodiment 35: An embodiment any of embodiments 23-34, wherein the zinc compound comprises zinc oxide, zinc pyrithione, or zinc ammonium adipate, or combinations thereof; wherein the phosphorus compound comprises benzene phosphinic acid; wherein the molar ratio of the phosphorus to the zinc ranges from 0.01:1 to 3:1; wherein the polymer composition has a relative viscosity of greater than 32; and wherein fibers formed from the polymer composition demonstrate a zinc retention rate greater than 85% when tested in a dye bath test.

Embodiment 36: An embodiment any of embodiments 23-35, wherein the zinc compound comprises zinc oxide; wherein the phosphorus compound comprises benzene phosphinic acid; wherein the molar ratio of the phosphorus to the zinc ranges from 0.01:1 to 2.5:1; the polymer composition has a relative viscosity of greater than 32, and fibers formed from the polymer composition demonstrate a zinc retention rate greater than 88% when tested in a dye bath test.

Embodiment 37: An embodiment any of embodiments 23-36, wherein the zinc compound comprises zinc ammonium adipate; fibers formed from the polymer composition demonstrate a zinc retention rate greater than 24% when tested in a dye bath test, and the polymer composition demonstrates a *Staphylococcus aureus* reduction greater than 90% and demonstrates a *Klebsiella pneumoniae* reduction greater than 95% as measured by ISO 20743:2013.

Embodiment 38: An embodiment any of embodiments 23-37, wherein the dye bath test comprises a liquid solution at a pH less than 5.

Embodiment 39: A method for making antimicrobial fibers comprising: providing a polymer composition having antimicrobial properties, the composition comprising from 50 wt % to 99.9 wt % of a polymer, from 5 wppm to 1000 wppm of zinc, and from 0.005 to 1 wt % of phosphorus, and forming the polymer composition into fibers, wherein fibers formed from the polymer composition demonstrate a zinc retention rate of greater than 20% when tested in a dye bath test.

Embodiment 40: An embodiment of embodiment 39, wherein the fibers demonstrate a zinc retention rate of greater than 20% when tested in a dye bath test.

Embodiment 41: An embodiment of embodiment 39 or 40, wherein polymer composition has a relative viscosity of at least 25.

Embodiment 42: An embodiment of any of embodiments 39-41, wherein the molar ratio of the phosphorus to the zinc in the polymer composition is at least 0.01:1.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that embodiments of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art.

We claim:

1. A polymer composition having antimicrobial properties, the composition comprising:
from 50 wt % to 99.9 wt % of a thermoplastic polymer,
a zinc compound comprising zinc oxide, zinc pyrithione, or zinc ammonium adipate, or combinations thereof, and
benzene phosphinic acid;
wherein the polymer composition has a relative viscosity of 20 to 70;
wherein zinc content ranges from 5 wppm to 900 wppm;
wherein phosphorous content ranges from 0.005 wt % to 1 wt %;
wherein the molar ratio of phosphorous to zinc ranges from 0.01:1 to 3:1;
wherein fibers formed from the polymer composition demonstrate a zinc retention rate of greater than 20% when tested in a dye bath test with dyeing at a pH of 4.0 to 5.5 and have a denier less than 12 dpf.

2. The polymer composition of claim 1, further comprising a delusterant comprising a titanium compound present in an amount less than 2.0 wt %.

3. The polymer composition of claim 1, wherein the polymer composition demonstrates a zinc retention rate greater than 24% when the composition is formed into fibers and tested in a dye bath test.

4. The polymer composition of claim 1, wherein the zinc compound comprises zinc oxide.

5. The polymer composition of claim 1, wherein the polymer composition demonstrates a *Staphylococcus aureus* reduction greater than 75% as measured by ISO 20743:2013.

6. The polymer composition of claim 1, wherein the polymer composition demonstrates a *Klebsiella pneumoniae* reduction greater than 90% as measured by ISO 20743:2013.

7. The polymer composition of claim 1, wherein the zinc compound comprises zinc oxide; wherein the molar ratio of phosphorous to zinc ranges from 0.01:1 to 2.5:1; and wherein fibers formed from the polymer composition demonstrate a zinc retention rate greater than 24% when tested in a dye bath with dyeing at a pH of 4.0 to 5.5.

8. A method for making antimicrobial fibers comprising:
providing a polymer composition having antimicrobial properties, the polymer composition comprising:
from 50 wt % to 99.9 wt % of a thermoplastic polymer,
a zinc compound comprising zinc oxide, zinc pyrithione, or zinc ammonium adipate, or combinations thereof, and
benzene phosphinic acid;
wherein the polymer composition has a relative viscosity less than 70;
wherein zinc content ranges from 5 wppm to 900 wppm;
wherein phosphorous content ranges from 0.005 wt % to 1 wt %;
wherein the molar ratio of phosphorous to zinc ranges from 0.01:1 to 3:1; and
forming the polymer composition into fibers,
wherein the fibers have a denier less than 12 dpf and demonstrate a zinc retention rate of greater than 20% when tested in a dye bath test with dyeing at a pH of 4.0 to 5.5.

9. The method of claim 8, wherein the polymer composition has a relative viscosity of 20 to 70.

10. The polymer composition of claim 1, wherein the thermoplastic polymer comprises polyamide.

11. The method of claim 8, wherein the thermoplastic polymer comprises polyamide.

12. A polymer composition having antimicrobial properties, the composition comprising:

from 50 wt % to 99.9 wt % of a thermoplastic polymer, zinc ammonium adipate, and phosphorous present in an amount ranging from 0.005 wt % to 1 wt %, wherein the polymer composition has a relative viscosity of 20 to 70; and wherein zinc content ranges from 5 wppm to 900 wppm, and wherein fibers formed from the polymer composition demonstrate a zinc retention rate of greater than 20% when tested in a dye bath test with dyeing at a pH of 4.0 to 5.5 and have a denier of less than 12 dpf; and wherein the polymer composition demonstrates a *Staphylococcus aureus* reduction greater than 75% and demonstrates a *Klebsiella pneumoniae* reduction greater than 90% as measured by ISO 20743:2013.

13. The polymer composition of claim 12, further comprising a delusterant comprising a titanium compound present in an amount less than 2.0 wt %.

14. The polymer composition of claim 12, wherein the polymer composition demonstrates a *Staphylococcus aureus* reduction greater than 90% as measured by ISO 20743:2013.

15. The polymer composition of claim 12, wherein the polymer composition demonstrates a *Klebsiella pneumoniae* reduction greater than 95% as measured by ISO 20743:2013.

16. A method for making antimicrobial fibers comprising:
providing a polymer composition having antimicrobial properties, the polymer composition comprising:

from 50 wt % to 99.9 wt % of a thermoplastic polymer, zinc ammonium adipate, and phosphorous present in an amount ranging from 0.005 wt % to 1 wt %;

wherein the polymer composition has a relative viscosity less than 70;

wherein zinc content ranges from 5 wppm to 900 wppm;

forming the polymer composition into fibers, wherein the fibers have a denier less than 12 dpf and demonstrate a zinc retention rate of greater than 20% when tested in a dye bath test with dyeing at a pH of 4.0 to 5.5.

17. The method of claim 16, further comprising a delusterant comprising a titanium compound present in an amount less than 2.0 wt %.

18. The method of claim 16, wherein the fibers demonstrate a *Staphylococcus aureus* reduction greater than 75% as measured by ISO 20743:2013.

19. The method of claim 16, wherein the fibers demonstrate a *Klebsiella pneumoniae* reduction greater than 90% as measured by ISO 20743:2013.

* * * * *